Oct. 18, 1949.    L. H. HERMAN    2,484,946
BOBBER FOR FISHLINES
Filed Oct. 14, 1947
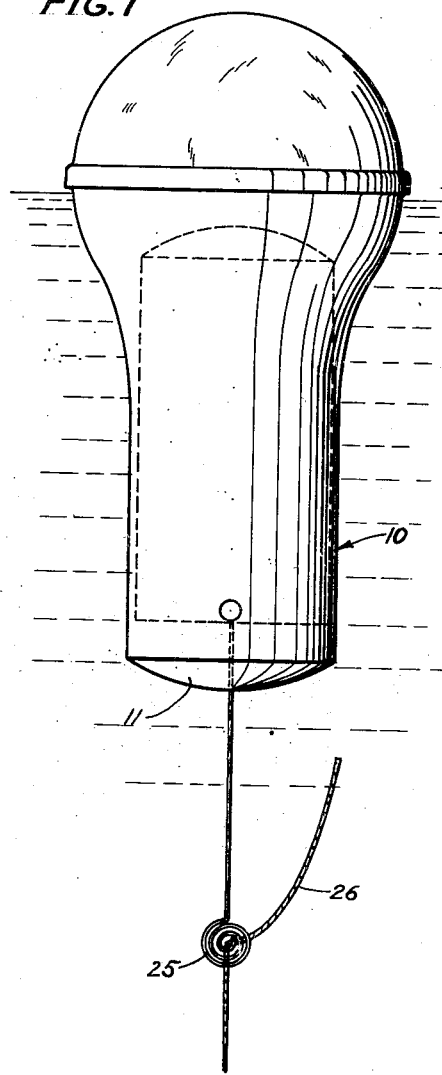
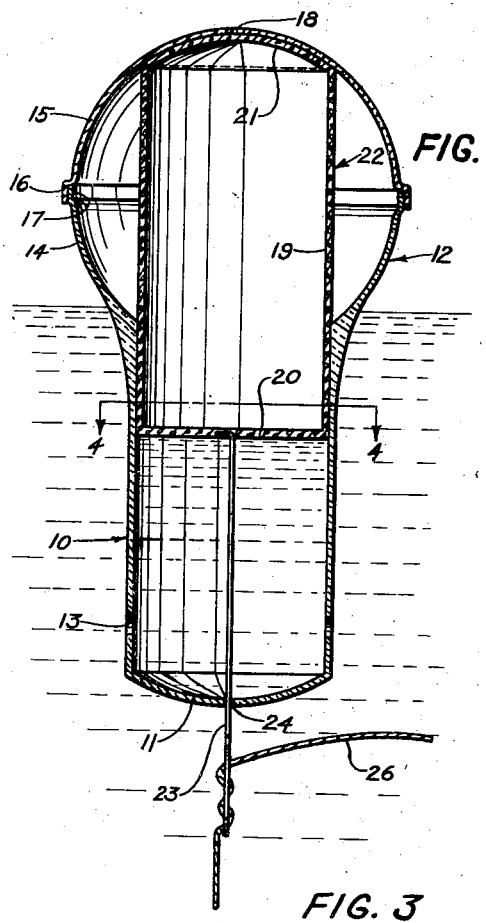
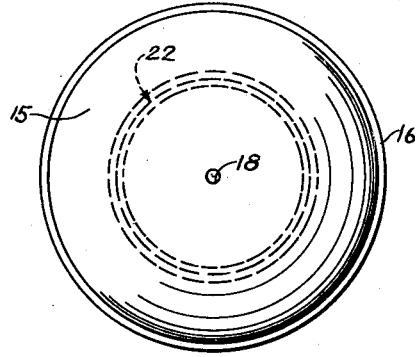
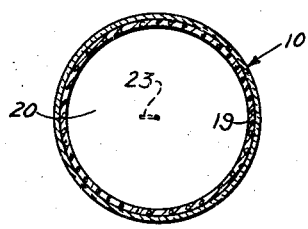
INVENTOR.
LEO H. HERMAN
BY
McMorrow, Berman & Davidson
Attorneys Patented Oct. 18, 1949

2,484,946

UNITED STATES PATENT OFFICE 2,484,946

BOBBER FOR FISHLINES

Leo H. Herman, St. Louis, Mo.

Application October 14, 1947, Serial No. 779,774

3 Claims. (Cl. 43—17)

This invention relates to a bobber for fishlines.

An object of this invention is to provide an improved bobber for fishlines, whereby the fisherman will be able to determine in the dark whether a fish has grabbed the hook.

Another object of this invention is to provide a bobber for either day or night fishing which includes a luminous member disposed in a hollow body and secured to the fishline, the luminous member being normally disposed in raised position within the transparent upper portion of the body so that the fisherman will be able to determine from the position of the luminous member whether a fish has grabbed the line.

In the dark, before a fish grabs the line, the luminous member will show up through the transparent upper portion of the hollow body so that the fisherman will know by glancing at the bobber whether a fish has grabbed the line, the luminous member being drawn downwardly by the fish upon grabbing the line, so that if the luminous member is not visible, the fisherman will know that a fish has grabbed the line.

Another object of this invention is to provide a bobber including a vertically movable luminous member slidable therein and adapted to be raised by water entering the lower portion of the bobber.

Another object of this invention is to provide a bobber of this kind which is of simple construction and can be made of relatively light-weight material.

With the above and other objects in view, my invention consists in the arrangement, combination and details of construction disclosed in the drawings and specification, and then more particularly pointed out in the appended claims.

In the drawings,

Figure 1 is a detailed side elevation of a bobber constructed according to an embodiment of this invention, Figure 2 is a vertical section taken through the bobber, Figure 3 is a plan view of the device, and Figure 4 is a sectional view taken on the line 4—4 of Figure 2.

Referring to the drawings, the numeral 10 designates generally a cylindrical body which is formed with a bottom wall 11 and provided with a plurality of holes 13 in the side wall of the body adjacent the bottom wall 11.

The cylindrical body 10 is fixed to a substantially ball-shaped member 12 which includes a lower globular member 14 and an upper globular member 15 forming a cap for the globular member 12.

The upper member 15 is formed with an annular offset flange 16 which removably engages about an annular flange 17 carried by the upper end of the lower member 14. The upper member 15 is preferably formed of transparent material, the purpose for which will be hereinafter described.

The upper member 15 at the top thereof is formed with a vent opening 18 so that the sliding indicator or signal member disposed within the bobber can be readily viewed from above. It will, of course, be understood that the lower member 14 and the body 10 may also be formed of transparent material, although in practice the lower member 14 and the body 10 are preferably opaque or colored so that the signal member or indicator cannot be seen when it is depressed or pulled downwardly into the body 10.

A signal member or indicator is slidably disposed in the body 10 and includes a cylindrical member 19 which is slidable within the interior of the body 10. The cylindrical member 19 is formed with a closed bottom wall 20 and also with a closed top wall 21 which is upwardly arched so as to follow the curvature of the inside of the upper member or cap 15.

The signal member or indicator generally designated as 22 is preferably formed of luminous material or is coated with luminous material such as phosphorus or the like so that when this member is in its uppermost position the signal member 22 will glow and can readily be viewed through the transparent cap or cover 15.

An elongated rod or wire 23 is fixed at one end to the bottom wall 20 in the axial center thereof and loosely extends through an opening 24 formed in the bottom wall 11. The rod or wire 23 is formed at its lower outer end with a coil 25 to which an intermediate portion of a fishline 26 is adapted to be secured.

In the use and operation of this bobber, the fishline is cast into the water with the line 26 secured to the coil 25. The bobber being formed of hollow construction, is buoyant so that it will readily float on the surface of the water.

The weight of the hook and sinker will hold the bobber upright so that the body 10 will be substantially entirely submerged within the water, whereas the globular portion of the bobber including the two members 14 and 15 will be disposed above the water surface. Water will enter through the openings 13 in the lower portion of the body 10, thereby forcing the closed signal member 19 upwardly as shown in Figure 2.

When a fish grabs the line 26 and pulls this line downwardly, the signal member 19 will be pulled downwardly, the water in the body 10 below the signal member 20 being forced out through the openings 13.

The openings 13 may be of any predetermined size, and, if desired may be relatively small in size so that the downward movement of the signal member which constitutes a plunger will be cushioned after the manner of a dash pot.

So long as the fisherman is able to see the signal member 22 in the upper portion of the bobber, he will know that a fish has not grabbed the hook, whereas when the signal member 22 is no longer visible, the fisherman will know that a fish has grabbed the line.

I do not mean to confine myself to the exact details of construction herein disclosed, but claim all variations falling within the purview of the appended claims.

Having thus described my invention, what I claim is:

1. A luminous bobber comprising a hollow body formed with openings in the lower portion thereof for entrance of water and an air vent opening in the upper portion, a closed luminous signal member slidable in said body, said body being formed with a transparent upper portion whereby said signal member may be visible when the latter is in the upper portion of said body, and a wire fixed to said signal member and extending downwardly through said body for attachment to a fishline whereby pull on the fishline will draw said luminous member downwardly into said body and below the transparent portion thereof.

2. A luminous bobber comprising an elongated hollow body formed with openings in the lower portion thereof for entrance of water into said lower portion and a vent opening in the upper portion, said lower portion being of cylindrical configuration, a cylindrical signal member in said lower portion formed with closed upper and lower ends, said signal member being formed of luminous characteristics and said body being formed of a transparent upper portion whereby said signal member may be viewed from above, and means fixedly connected with said signal member extending through the lower portion of said body for attaching said signal member to a fishline, pull on said fishline in a downward direction pulling said signal member downwardly into said body and forcing water in the lower portion of said body outwardly through said first mentioned openings.

3. A bobber comprising a hollow body formed of a cylindrical lower portion adapted to be submerged in water and formed with a substantially globular upper portion adapted to be normally disposed above the water surface, said upper portion having an air vent opening therein, at least a portion of said globular upper portion being transparent, a closed signal member slidable in said body and formed of luminous characteristics, said body being formed with openings in the lower portion thereof whereby water may enter said body below said signal member and normally force the latter upwardly into the transparent upper portion of said body, an elongated rod fixed to said signal member and loosely extending through the bottom of said body, and means carried by said rod for securing the latter to a fishline, pull on said fishline effecting downward movement of said signal member in said body and forcing water in the lower portion of said body outwardly through said last mentioned openings.

LEO H. HERMAN.

REFERENCES CITED

The following references are of record in the file of this patent:

UNITED STATES PATENTS

| Number | Name | Date |
|---|---|---|
| 1,437,284 | Wagner | Nov. 28, 1922 |
| 1,992,874 | McDowell | Feb. 26, 1935 |
| 2,022,193 | Gaede | Nov. 26, 1935 |

FOREIGN PATENTS

| Number | Country | Date |
|---|---|---|
| 15,097 | Great Britain | Nov. 17, 1884 |